United States Patent
Nguyen

(10) Patent No.: US 12,058,473 B2
(45) Date of Patent: Aug. 6, 2024

(54) MOTION BASED THERMAL IMAGE PROCESSING SYSTEMS AND METHODS

(71) Applicant: FLIR Systems AB, Täby (SE)

(72) Inventor: Tien C. Nguyen, Täby (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 17/232,062

(22) Filed: Apr. 15, 2021

(65) Prior Publication Data
US 2021/0329178 A1 Oct. 21, 2021

Related U.S. Application Data

(60) Provisional application No. 63/010,526, filed on Apr. 15, 2020.

(51) Int. Cl.
*H04N 5/33* (2023.01)
*G01J 5/20* (2006.01)
*H04N 23/68* (2023.01)
*G01J 5/00* (2022.01)

(52) U.S. Cl.
CPC .......... *H04N 5/33* (2013.01); *G01J 5/20* (2013.01); *H04N 23/681* (2023.01); *G01J 2005/0077* (2013.01)

(58) Field of Classification Search
CPC ............ G01J 2005/0077; G01J 5/20; H04N 5/23251; H04N 5/23258; H04N 5/23267; H04N 5/33
See application file for complete search history.

(56) References Cited

U.S. PATENT DOCUMENTS

| 7,649,174 B2 | 1/2010 | Mammen et al. | |
|---|---|---|---|
| 2013/0155188 A1* | 6/2013 | Heinke | H04N 5/33 348/46 |
| 2017/0087416 A1* | 3/2017 | Hu | G06K 9/00543 |
| 2018/0063454 A1* | 3/2018 | Olsson | H04N 5/145 |
| 2018/0314826 A1* | 11/2018 | Mankovskii | G06V 10/761 |

FOREIGN PATENT DOCUMENTS

| EP | 2590138 A1 | 5/2013 | |
|---|---|---|---|
| WO | WO-2018045107 A1 * | 3/2018 | G01J 5/0014 |

* cited by examiner

*Primary Examiner* — Md N Haque
(74) *Attorney, Agent, or Firm* — Haynes and Boone, LLP

(57) ABSTRACT

Various techniques are provided for improved detection of scene changes using a thermal imager. In one example, a method includes capturing a plurality of thermal images of a scene using a thermal imager. The method also includes detecting motion associated with the thermal imager during the capturing. The method also includes determining a temporal delay in response to the detected motion. The method also includes selecting first and second ones of the thermal images captured at corresponding first and second times separated by the temporal delay. The method also includes processing the first and second thermal images to generate a comparison thermal image identifying changes in the scene between the first and second times. Additional methods and systems are also provided.

20 Claims, 4 Drawing Sheets

MOTION BASED THERMAL IMAGE PROCESSING SYSTEMS AND METHODS

CROSS-REFERENCE TO RELATED APPLICATIONS

This patent application claims priority to and the benefit of U.S. Provisional Patent Application No. 63/010,526 filed Apr. 15, 2020 and entitled "MOTION BASED THERMAL IMAGE PROCESSING SYSTEMS AND METHODS" which is hereby incorporated by reference in its entirety.

TECHNICAL FIELD

The present invention relates generally to thermal imaging and, more particularly, to thermal image processing to detect scene changes.

BACKGROUND

Thermal imagers are often used to detect gas plumes or other features that may not be readily perceived by humans or visible light imagers. In some cases, thermal images captured at different times may be compared to detect changes in a scene.

However, such comparisons can be difficult in cases where the thermal imager is in motion. For example, movement of the thermal imager can cause the captured thermal images to exhibit additional changes in the imaged scene which appear as noise in the resulting image comparison.

Conventional image processing techniques generally require a user to specify parameters associated with such processing. Unfortunately, this can be challenging for the user to select. In particular, it can result in a burdensome set of tasks where the user adjusts parameters, reviews the resulting thermal image comparison for possible noise, and then readjusts in a trial and error fashion that may be distracting in normal use conditions.

SUMMARY

Various techniques are disclosed to provide for improved detection of scene changes using a thermal imager. In particular, an imaging system and related methods may be provided in which a temporal delay used for image processing is automatically adjusted in response to response to motion associated with the thermal imager.

In one embodiment, a method includes capturing a plurality of thermal images of a scene using a thermal imager; detecting motion associated with the thermal imager during the capturing; determining a temporal delay in response to the detected motion; selecting first and second ones of the thermal images captured at corresponding first and second times separated by the temporal delay; and processing the first and second thermal images to generate a comparison thermal image identifying changes in the scene between the first and second times.

In another embodiment, a system includes a thermal imager; a motion sensor; and a logic device configured to: operate the thermal imager to capture a plurality of thermal images of a scene, detect motion associated with the thermal imager during the thermal image capture using the motion sensor, determine a temporal delay in response to the detected motion, select first and second ones of the thermal images captured at corresponding first and second times separated by the temporal delay, and process the first and second thermal images to generate a comparison thermal image identifying changes in the scene between the first and second times.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
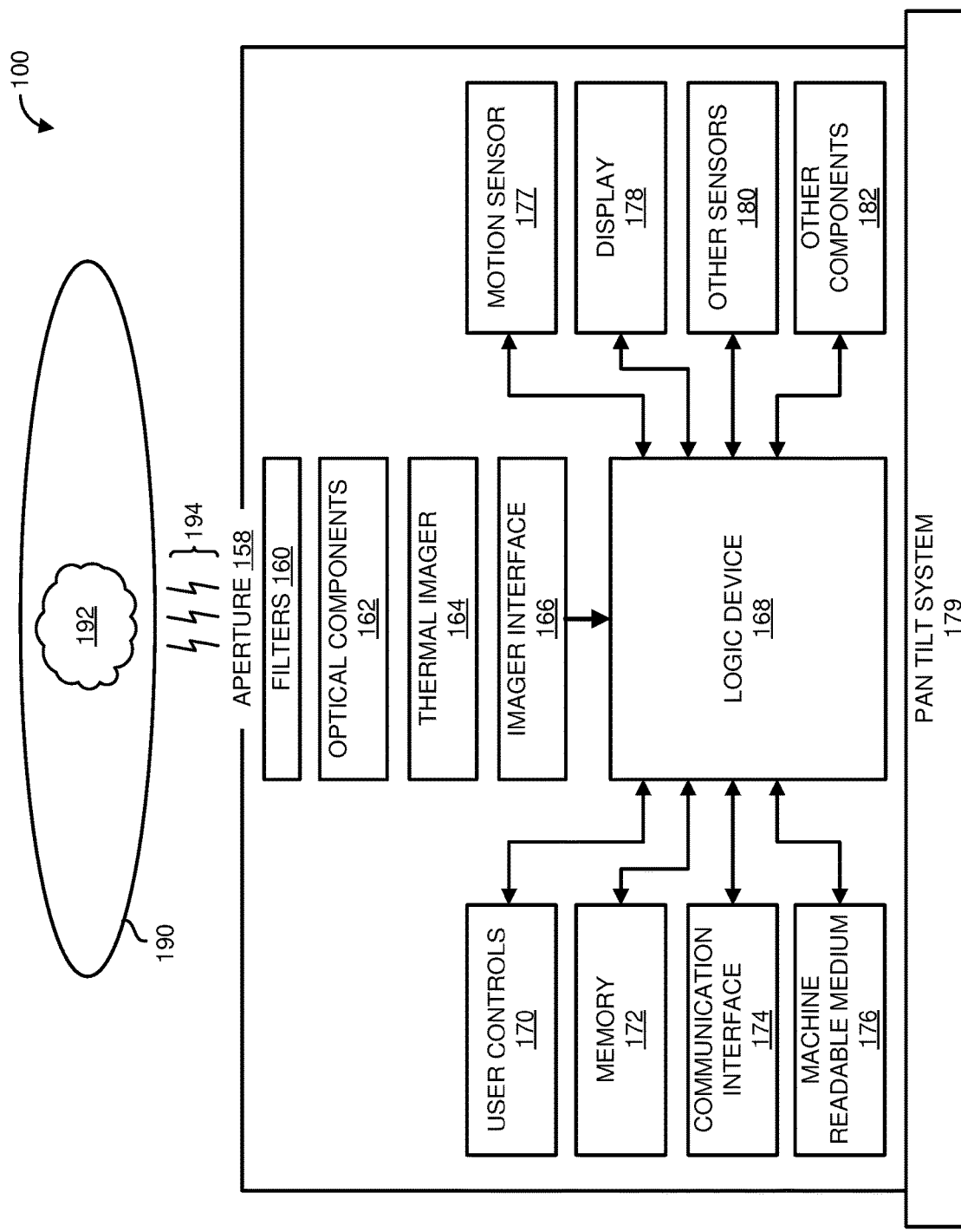
FIG. 1 illustrates a block diagram of an imaging system in accordance with an embodiment of the disclosure.

In accordance with embodiments further discussed herein, various methods and systems in which thermal images are automatically selected for comparison in response to detected motion. In particular, a temporal delay (e.g., a time period, a specified number of thermal images, and/or other specified delay) may be determined based on the detected motion. In some embodiments, the temporal delay may be inversely proportional to the detected motion such that larger temporal delays are selected for smaller amounts of detected motion, and vice versa.

In some embodiments, the techniques discussed herein may be used to implement an automatically configured High Sensitivity Mode (HSM) for gas imaging cameras. Conventional HSM implementations generally select thermal images captured of a scene at different times for processing. One of the selected images is compared with (e.g., entirely subtracted and/or partially subtracted through appropriate weighting of pixels) the other selected image to provide a resulting comparison thermal image.

If the imaged scene is generally static with little artificial motion (e.g., motion caused by camera shake, translation of the thermal imager through the scene, other movement, and/or other factors), then static features of the scene may be attenuated or cancelled out by the comparison, thereby making the changes in the scene (e.g., a gas leak or other changing features) clearer and more visible in the resulting comparison thermal image. In this case, the thermal images selected for comparison may be separated by a substantial temporal delay (e.g., multiple thermal images) so as to more clearly reveal changes in the scene that have elapsed over time in the comparison thermal image.

However, if the thermal imager experiences motion during the capture of a sequence of thermal images, then even static features of the scene may artificially shift between thermal images. As a result, when the thermal images are compared, these artificial changes in the scene may appear as noise in the resulting comparison thermal image as one thermal image is compared with (e.g., subtracted from) the other. In this case, thermal images may be selected for comparison that are separated by a much shorter temporal delay (e.g., a single or only several thermal images) so as to reduce the amount and/or the likelihood of artificial shifts in the scene occurring between the thermal images selected for comparison, and thereby reduce noise in the comparison thermal image.

In conventional HSM implementations, a user is tasked with adjusting the temporal delay in a trial and error fashion. For example, the user may initially set the temporal delay to a default amount and then may view one or more comparison thermal images and determine whether noise is present. If the user sees noise in the comparison thermal images, then the user may decrease the temporal delay to select thermal images for processing that are captured closer in time to potentially reduce noise in the comparison thermal images. If the user does not identify noise, then the user may increase the temporal delay to select thermal images for processing that are captured farther apart in time to potentially reveal additional changes in the scene.

However, such a user-based approach requires extensive trial and error and ongoing tuning and adjustment by the user. For example, although a user may select a temporal delay that provides comparison thermal images with acceptable noise levels under some conditions, those conditions may nevertheless change. In this regard, as a thermal imager experiences greater or lesser amounts of motion during the ongoing capturing of thermal images (e.g., associated with unintentional movement or intentional movement such a user panning the thermal imager across the scene), a previously selected temporal delay may become stale and result in increased noise or less apparent scene changes than would be available using a different temporal delay. As a result, the user may not be able to reliably detect desired scene changes with sufficient clarity or with sufficiently low noise levels as may be desired or preferred.

In contrast to prior approaches, embodiments of the present disclosure provide automatic adjustment of temporal delays used for thermal image comparison processing in response to detected motion. This approach advantageously reduces the burden on the user and provides realtime and accurate adjustment of comparison processing parameters for improved comparison images with reduced noise and increased visualization of scene changes such as gas plumes (e.g., corresponding to gas leaks).

FIG. 1 illustrates a block diagram of an imaging system 100 in accordance with an embodiment of the disclosure. As shown, imaging system 100 includes a housing 151 (e.g., a camera body) having an aperture 158, one or more filters 160, one or more optical components 162, a thermal imager 164, an imager interface 166, a logic device 168, user controls 170, a memory 172, a communication interface 174, a machine readable medium 176, a motion sensor, a display 178, other sensors 180, and other components 182.

In various embodiments, imaging system 100 may be implemented, for example, as a camera system such as a portable handheld camera system, a small form factor camera system implemented as part of another device, a fixed camera system, and/or other appropriate implementations. Imaging system 100 may be positioned to receive infrared radiation 194 from a scene 190 (e.g., a field of view of imaging system 100). In various embodiments, scene 190 may include various features of interest 192 (e.g., a gas plume corresponding to a gas leak shown in FIG. 1).

In some embodiments, imaging system 100 may be provided with a pan tilt system 179 which may be configured to selectively adjust pan, tilt, and/or other orientations of imaging system 100 relative to scene 190. In some embodiments, pan tilt system 179 may be controlled by appropriate signals provided by logic device 168 in response to commands provided by user controls 170, logic device 168 itself, remote systems in communication with imaging system 100, and/or other techniques.

Motion sensor 177 may be implemented as any appropriate type of device used to detect motion associated with imaging system 100 and, by extension, thermal imager 164. Such motion may include, for example, angular movement, translation movement, rotational movement, and/or other changes in orientation. For example, in some embodiments, motion sensor 177 may be implemented using accelerometers, vibration sensors, gyroscopes, global positioning system (GPS) devices, depth sensing systems (e.g., time of flight cameras, LiDAR scanners, thermal cameras, visible light cameras, and/or others), antennas, other devices, and/or any combination thereof as desired. In some embodiments, motion sensor 177 may send appropriate signals to logic device 168 for processing to determine the absolute and/or relative motion of imaging system 100. In some embodiments, motion sensor 177 may be implemented in pan tilt system 179.

Infrared radiation 194 is received through aperture 158 and passes through one or more filters 160 which may be provided to selectively filter particular thermal wavelengths of interest for images to be captured by thermal imager 164. Optical components 162 (e.g., an optical assembly including one or more lenses, additional filters, transmissive windows, and/or other optical components) pass the filtered infrared radiation 194 for capture by thermal imager 164.

Thus, it will be appreciated that filters 160 and/or optical components 162 may operate together to selectively filter out portions of infrared radiation 194 such that only desired wavelengths and/or desired thermal radiation intensities are ultimately received by thermal imager 164. In various embodiments, any desired combination of such components may be provided (e.g., various components may be included and/or omitted as appropriate for various implementations).

Thermal imager 164 may capture thermal images of scene 190 in response to infrared radiation 194. Thermal imager 164 may include an array of sensors for capturing thermal images (e.g., thermal image frames) of scene 190. In some embodiments, thermal imager 164 may also include one or more analog-to-digital converters for converting analog signals captured by the sensors into digital data (e.g., pixel values) to provide the captured images. Imager interface 166 provides the captured images to logic device 168 which may be used to process the images, store the original and/or processed images in memory 172, and/or retrieve stored images from memory 172. Additional implementation details of an embodiment of thermal imager 164 are further discussed herein with regard to FIG. 2.

Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of imaging system 100 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of system 100 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of imaging system 100 and/or separate from imaging system 100, with stored instructions provided to imaging system 100 by coupling the machine readable medium 176 to imaging system 100 and/or by imaging system 100 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of system 100. Logic device 168 may be configured to display images and information on display 178. For example, logic device 168 may be configured to retrieve images and information from memory 172 and provide images and information to display 178 for presentation to the user of system 100. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom. In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 180 including, for example, microphones, navigation sensors, temperature sensors, and/or other sensors as appropriate.

Logic device 168 may be configured to receive and pass images from imager interface 166 and signals and data from motion sensor 177, sensors 180, and/or user controls 170 to one or more external devices (e.g., remote systems) through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 182 such as speakers, additional displays, visual indicators (e.g., recording indicators), vibration actuators, a battery or other power supply (e.g., rechargeable or otherwise), and/or additional components as appropriate for particular implementations.

Although various features of imaging system 100 are illustrated together in FIG. 1, any of the various illustrated components and subcomponents may be implemented in a distributed manner and used remotely from each other as appropriate.

Although imaging system 100 has been described in the context of a thermal imaging system, other embodiments are also contemplated. In some embodiments, aperture 158, filters 160, optical components 162, and/or imager 164 may be implemented to pass and capture other wavelengths such as visible light wavelengths in addition to or instead of thermal wavelengths. For example, imaging system 100 may be implemented to capture both thermal images and visible light images of scene 190 for comparison with each other to detect scaling or other phenomena. As another example, different imaging systems 100 implemented for different wavelengths may be used to capture thermal images and visible light images of scene 190.

Figure 2:
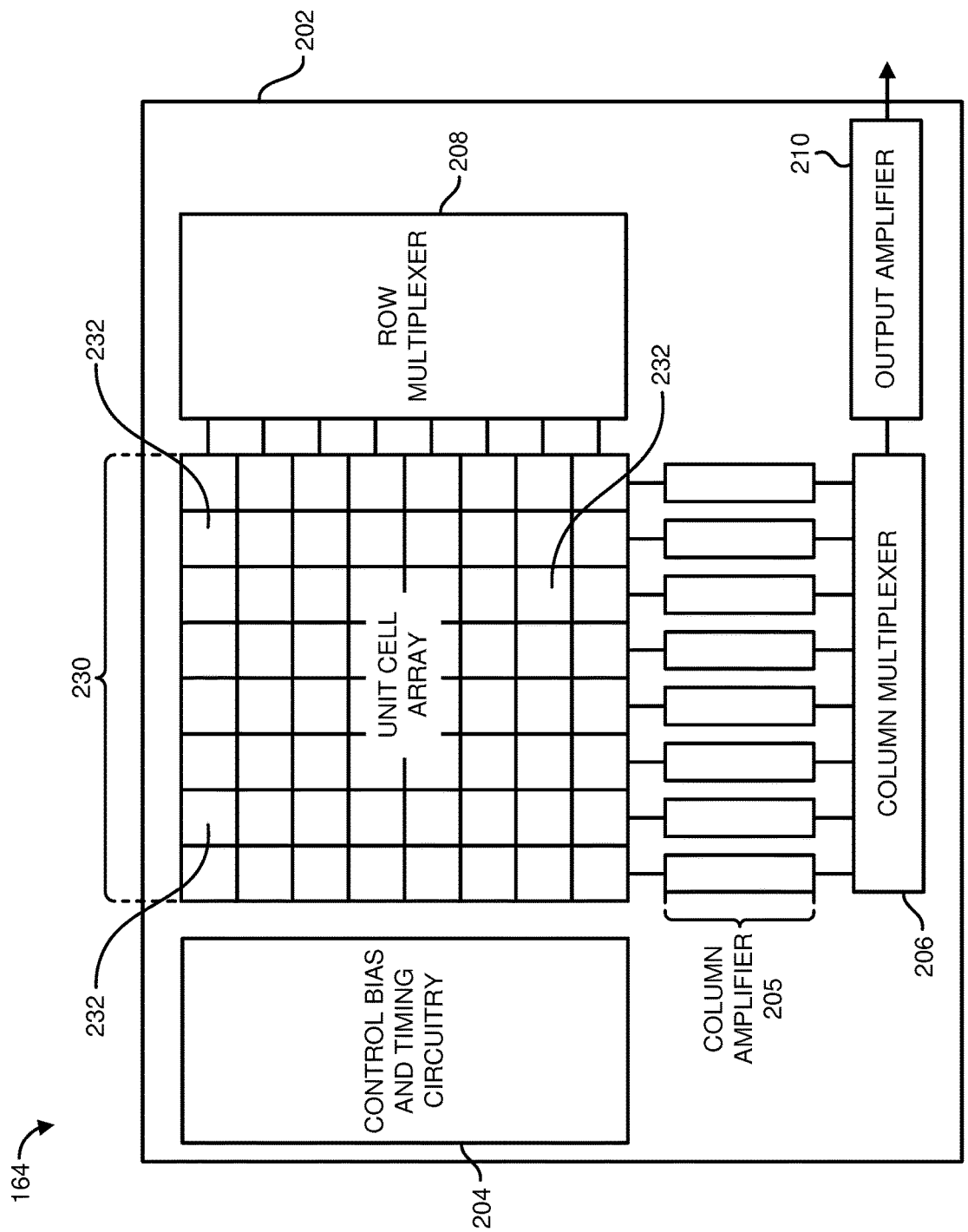
FIG. 2 illustrates a block diagram of a thermal imager in accordance with an embodiment of the disclosure.

FIG. 2 illustrates a block diagram of thermal imager 164 in accordance with an embodiment of the disclosure. In this illustrated embodiment, thermal imager 164 is a focal plane array (FPA) including a sensor array 230 of infrared sensors 232 (e.g., implemented as unit cells) and a read out integrated circuit (ROIC) 202. Although an 8 by 8 array of infrared sensors 232 is shown (e.g., corresponding to rows and columns of pixels), this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202.

ROIC 202 includes bias generation and timing control circuitry 204, column amplifiers 205, a column multiplexer 206, a row multiplexer 208, and an output amplifier 210. Images captured by infrared sensors 232 may be provided by output amplifier 210 to logic device 168 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
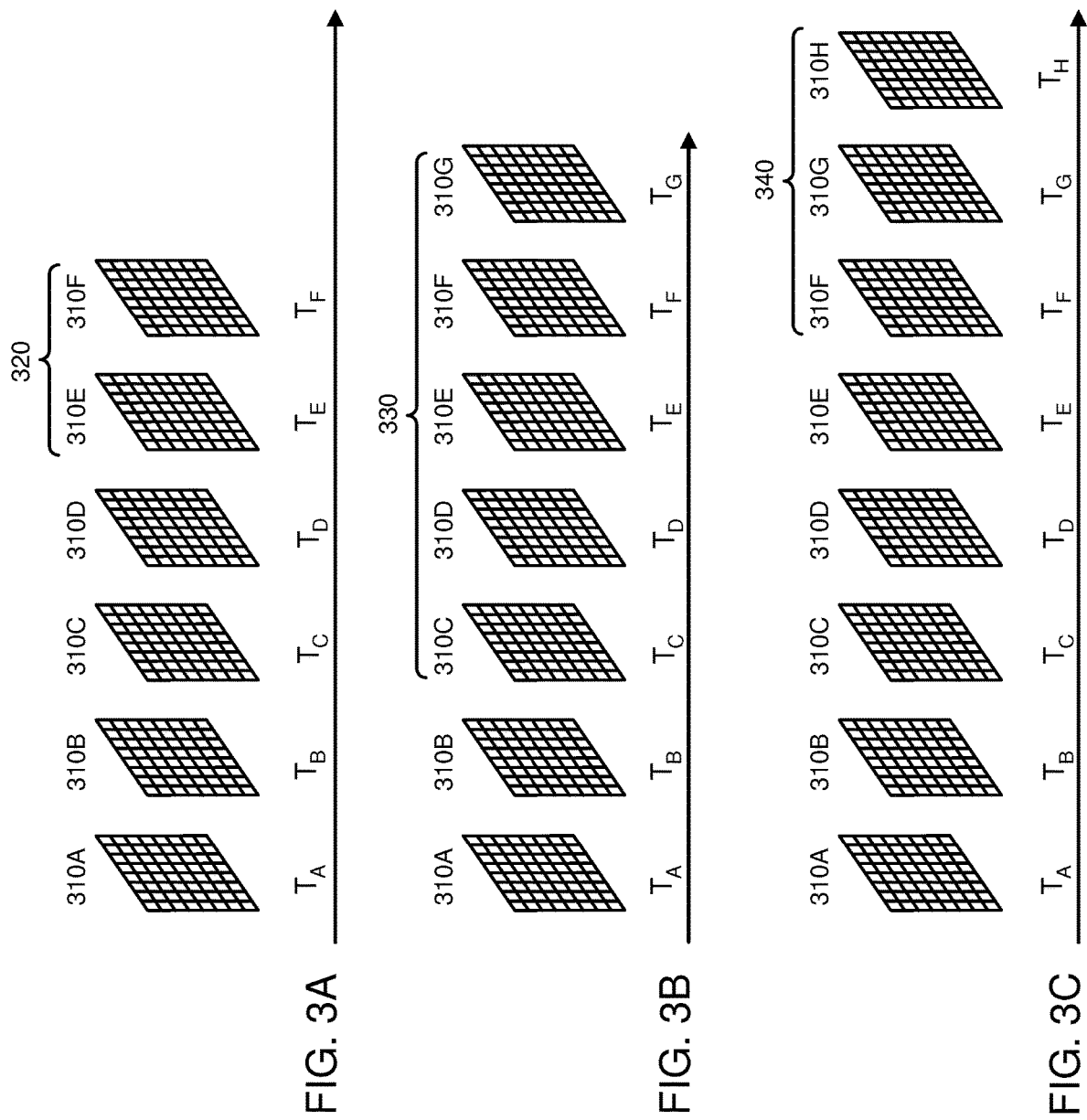
FIGS. 3A-C illustrate sequences of thermal images captured by a thermal imager for processing in accordance with embodiments of the disclosure.
Figure 4:
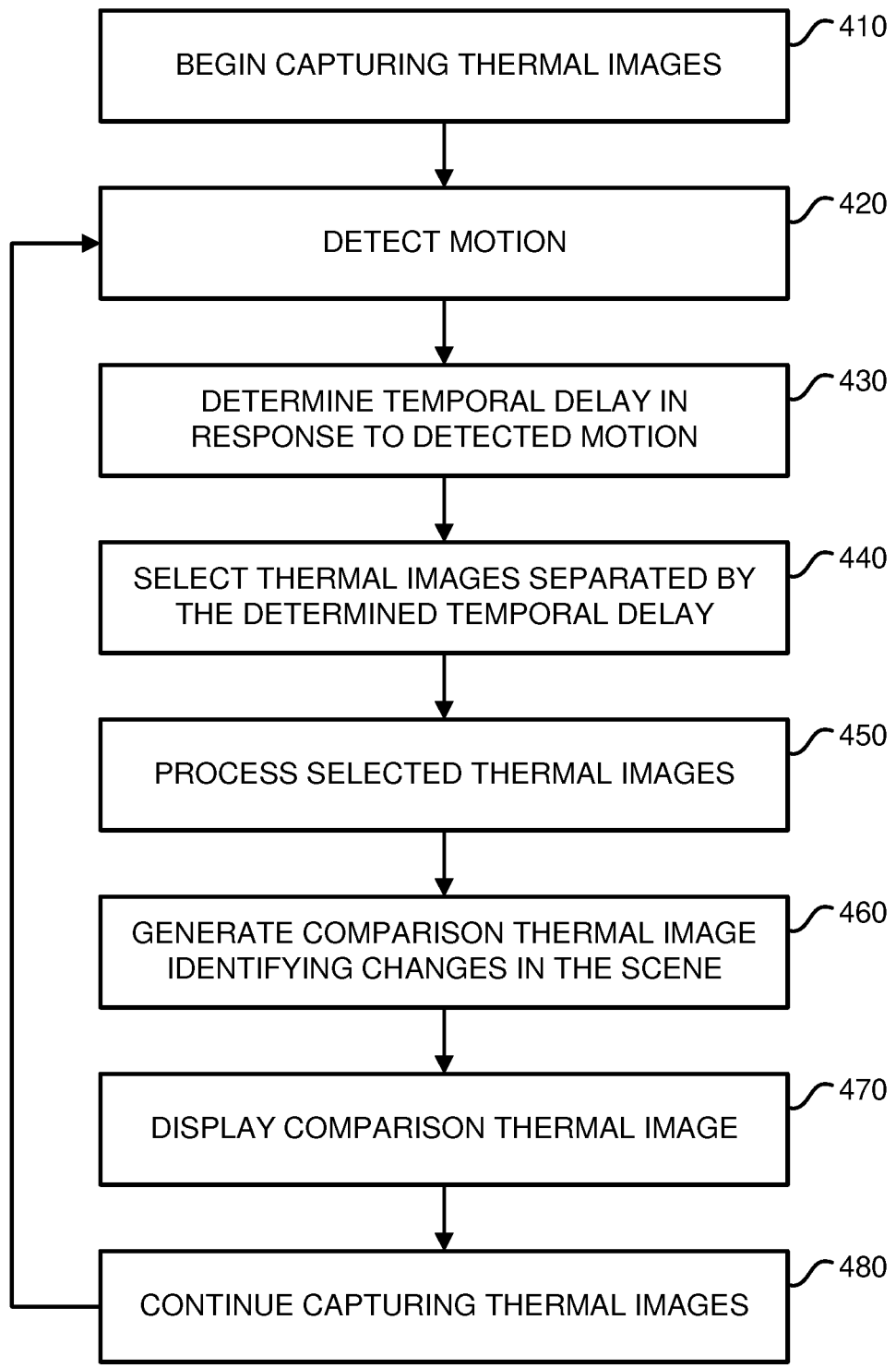
FIG. 4 illustrates a process of generating a comparison thermal image in accordance with an embodiment of the disclosure.

FIGS. 3A-C illustrate sequences of thermal images captured by thermal imager 164 for processing in accordance with embodiments of the disclosure as will be further discussed with regard to the process of FIG. 4. FIG. 4 illustrates a process of generating a comparison thermal image in accordance with an embodiment of the disclosure. In various embodiments, the operations of FIG. 4 may be performed by thermal imager 164, logic device 168, and/or any of the various components of imaging system 100 and/or remote systems as appropriate.

In block 410, thermal imager 164 begins capturing thermal images of scene 190. For example, thermal imager 164 may repeatedly capture thermal images in a sequence at a desired frame rate (e.g., 60 Hz or greater or lesser frame rates) such that individual thermal images are captured at times separated by known time periods (e.g., separated by approximately 16.7 milliseconds in a 60 Hz frame rate).

FIG. 3A illustrates an example sequence of thermal images 310A to 310F captured at corresponding times TA to TF during block 410. In this illustration, thermal image 310F is the most recently captured thermal image which occurred at time TF.

In block 420, motion sensor 177 detects motion associated with thermal imager 164 that may have occurred during the capturing performed in block 410 and provides appropriate signals to logic device 168 communicating the same. In this regard, although block 420 is illustrated sequentially with block 410 for ease of illustration, it will be appreciated that block 420 may performed concurrently with block 410 to detect motion at any time between time TA to time TF during while the sequence of thermal images 310A to 310F is captured. In some embodiments, the motion detection may be performed between time TE and time TF to detect motion close in time to the capturing of the most recent thermal image 310F.

As discussed, the motion detected in block 420 may include, for example, angular movement, translation movement, rotational movement, and/or other changes in orientation of thermal imager and/or imaging system 100. In some embodiments, thermal imager 164 may be fixably secured to imaging system 100 such that motion of thermal imager 164 may be inferred or extrapolated from the motion of imaging system 100 (e.g., detected by motion sensor 177 provided in housing 151 and/or in pan tilt system 179). In some embodiments, motion sensor 177 may be fixably secured to thermal imager 164 to more directly detect motion associated with thermal imager 164.

In block 430, logic device 168 determines a temporal delay in response to the detected motion to be used for selecting thermal images for comparison processing. In some embodiments, the determined temporal delay may be inversely proportional to the detected motion such that increased detected motion will result in decreased temporal delay and vice versa.

In some embodiments, the temporal delay may identify a number of thermal images separating the thermal images to be selected for comparison as further discussed herein. In some embodiments, the temporal delay may identify a time period associated with a particular number of images (e.g., the time period may be divided by the frame rate to determine a number of images). In some embodiments, logic device 168 may maintain an appropriate look up table and/or other record (e.g., stored in memory 172) providing a predetermined correlation between the detected motion and a corresponding temporal delay. In some embodiments, logic device 168 may calculate the temporal delay using one or more appropriate equations using the detected motion as at least one input value thereto and/or in combination with a predetermined correlation.

In block 440, logic device 168 selects two of the captured thermal images 310A to 310F for processing which are separated by the determined temporal delay. Turning again to the example shown in FIG. 3A, if motion sensor 177 detected a large amount of motion in block 420 (e.g., at or close to time TF), then a small temporal delay 320 may be determined in block 430 corresponding to a temporal delay (e.g., separation) of only one thermal image. Accordingly, in this example, logic device 168 selects the sequential thermal images 310E and 310F for processing, as they are delayed (e.g., separated) relative to each other by only one thermal image.

In this example, thermal image 310F (e.g., the most recently captured thermal image) is selected, and the immediately prior thermal image 310E is selected to be subtracted from thermal image 310F. However, this is not required. Indeed, any of thermal images 310B to 310F could likewise be selected as one image and any of the immediately prior thermal images 310A to 310E could be selected in this example (again, using a temporal delay of one thermal image in this case for a large detected motion value).

In block 450, logic device 168 processes the two selected thermal images. In some embodiments, block 450 may include subtracting all or part of one of the selected thermal images from the other. In some embodiments, the subtracting may including selectively weighting various pixel values of one selected thermal image before subtracting it from the other selected thermal image. In some embodiments, block 450 may include preprocessing one or more of the selected images by temporal filtering (e.g., updating the selected image to include weighted contributions from previously captured images to reduce noise) before performing subtraction. Although processing by subtraction has been discussed, other appropriate processing to compare the selected images may be performed. Continuing the example of FIG.

3A, block 450 may include subtracting selected thermal image 310E from selected thermal image 310F.

In block 460, logic device 168 generates a comparison thermal image in response to the process of block 450. The comparison thermal image identifies changes in scene 190 occurring between the two thermal images selected in block 440 corresponding to the temporal delay determined in block 430. For example, in some embodiments, the comparison thermal image may be a difference image represented changes in pixel values (or weighted changes in some embodiments) between the selected thermal images. In the current example, block 460 may include generating a difference thermal image resulting from the subtraction of thermal image 310E from thermal image 310F.

In block 470, imaging system 100 presents the comparison thermal image to a user, for example, on display 178. Because the comparison thermal image was generated by processing thermal images selected using a temporal delay inversely proportional to detected motion, the resulting comparison thermal image may exhibit less noise and improved gas contrast and clarity over conventional user-based trial and error approaches.

In block 480, thermal imager 164 continues capturing thermal images and the process returns to block 420. In this regard, blocks 420 to 480 may repeat in an iterative fashion to generate additional comparison thermal images based on updated temporal delay values as new motion values are detected. These iterations will be further discussed in relation to the example sequences of thermal images illustrated in FIGS. 3B and 3C.

Turning now to FIG. 3B, the original sequence of thermal images 310A to 310F is shown with an additional thermal image 310G captured at time TG during block 480. Thus, it will be appreciated that process of FIG. 4 returns to block 420 shortly after time TG. In the second iteration of block 420, a small amount of motion may be detected in this example. As a result, the temporal delay determined in the second iteration of block 430 may be significantly longer than previously determined in the first iteration. For example, in the embodiment shown in FIG. 3B, a temporal delay 330 corresponding to four thermal images has been determined. Accordingly, in this example iteration of block 440, the most recent thermal image 310G is selected and the earlier thermal image 310C corresponding to the updated temporal delay of four thermal images is selected. As similarly discussed above, although the most recently captured thermal image 310G and earlier thermal image 310C are selected in this second iteration, any of thermal images 310E to 310G could have been selected, and any of the thermal images 310A to 310C could have been selected (again, using a temporal delay of four thermal images in this case for a small detected motion value).

Continuing the example of FIG. 3B, thermal images 310C and 310G may be processed in the second iteration of block 450 and a corresponding comparison thermal image may be generated in the second iteration of block 460. In this regard, it will be appreciated that the second generated comparison thermal image may exhibit additional scene change information over the previous iteration of block 460 due to the longer temporal delay 330 associated with the reduced detected motion. As a result, feature 192 (e.g., a gas plume) may be more easily viewed by a user when the third comparison thermal image is displayed in block 470 without introducing excessive noise.

Block 480 may then be repeated to capture one or more additional thermal images and the process returns to block 420 for a third iteration.

Turning now to FIG. 3C, the previous sequence of thermal images 310A to 310G is shown with an additional thermal image 310H captured at time TH during block 480. Thus, it will be appreciated that process of FIG. 4 returns to block 420 for a third iteration shortly after time TH. In the third iteration of block 420, an intermediate amount of motion may be detected. As a result, the temporal delay determined in the third iteration of block 430 may be longer than determined in the first iteration, but shorter than determined in the third iteration. For example, in the embodiment shown in FIG. 3C, a temporal delay 340 corresponding to two thermal images has been determined. Accordingly, in the third iteration of block 440, the most recent thermal image 310H is selected and the earlier thermal image 310F corresponding to the updated temporal delay of two thermal images is selected. As similarly discussed above, although the most recently captured thermal image 310H and earlier thermal image 310F are selected in this third iteration, any of thermal images 310C to 310H could have been selected, and any of the thermal images 310A to 310F could have been selected (again, using a temporal delay of two thermal images in this case for an intermediate detected motion value).

Continuing the example of FIG. 3C, thermal images 310F and 310H may be processed in the third iteration of block 450 and a corresponding comparison thermal image may be generated in the third iteration of block 460. In this regard, it will be appreciated that the third generated comparison thermal image may still exhibit additional scene change information in comparison to the first generated comparison thermal image due to the longer temporal delay 340 relative to the shorter temporal delay 320 of the first iteration. As a result, feature 192 may be still be easily viewed by a user when the third comparison thermal image is displayed in block 470 without introducing excessive noise.

In view of the above discussion, it will be appreciated that the process of FIG. 4 may continue to iterate through blocks 420 to 480 with newly determined temporal delays that are automatically adjusted in realtime in response to newly detected motion. As a result, comparison thermal images may be generated in a manner that maintains reduced noise under high motion conditions and provides improved detection of scene changes under low motion conditions without requiring a user to actively adjust the associated temporal delays.

Other embodiments are also contemplated. For example, although particular temporal delays ranging from one thermal image to four thermal images have been discussed, any desired temporal delays (e.g., longer or shorter) may be used in various embodiments. Moreover, although earlier captured thermal images have been discussed as being subtracted from later captured thermal images, it is also contemplated that later captured thermal images may be subtracted from earlier captured thermal images. In addition, although the most recently captured thermal images have been discussed as being used for comparison, any captured thermal images may be used in various embodiments (e.g., captured at earlier or intermediate times).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
capturing a plurality of thermal images of a scene using a thermal imager;
detecting motion associated with the thermal imager during the capturing;
determining a temporal delay based on the detected motion, wherein the temporal delay is correlated with the detected motion;
selecting a first thermal image from the thermal images, and selecting a second thermal image from the thermal images, wherein the first and second thermal images are captured at corresponding first and second times separated by the temporal delay; and
processing the first and second thermal images to generate a comparison thermal image identifying changes in the scene between the first and second times;
wherein the motion is a first detected motion, the temporal delay is a first temporal delay, and the comparison thermal image is a first comparison thermal image, the method further comprising:
detecting a second motion associated with the thermal imager during the capturing;
determining a second temporal delay based on the second detected motion, wherein the second temporal delay is greater than or less than the first temporal delay, wherein the second temporal delay is correlated with the second detected motion;
selecting a third thermal image from the thermal images, and selecting a fourth thermal image from the thermal images, wherein the third and fourth thermal images are captured at corresponding third and fourth times separated by the second temporal delay; and
processing the third and fourth thermal images to generate a second comparison thermal image identifying changes in the scene between the third and fourth times.

2. A method comprising:
capturing a plurality of thermal images of a scene using a thermal imager;
detecting motion associated with the thermal imager during the capturing;
determining a temporal delay based on the detected motion, wherein the temporal delay is correlated with the detected motion;
selecting a first thermal image from the thermal images, and selecting a second thermal image from the thermal images, wherein the first and second thermal images are captured at corresponding first and second times separated by the temporal delay;
processing the first and second thermal images to generate a comparison thermal image identifying changes in the scene between the first and second times; and
selectively increasing or decreasing the temporal delay in response to a change in the detected motion.

3. The method of claim 1, wherein the temporal delay corresponds to a number of the captured thermal images and/or a time period, wherein the determining uses a predetermined correlation between the detected motion and the temporal delay.

4. The method of claim 1, wherein the temporal delay is inversely proportional to the detected motion.

5. The method of claim 1, wherein the comparison thermal image is a difference thermal image.

6. The method of claim 1, wherein the processing comprises subtracting the second thermal image from the first thermal image.

7. The method of claim 2, wherein the temporal delay is inversely proportional to the detected motion.

8. The method of claim 2, wherein the plurality of thermal images are captured at a fixed frame rate.

9. The method of claim 1, wherein the first thermal image is a most recently captured one of the thermal images and the second thermal image is an earlier captured one of the thermal images.

10. The method of claim 1, wherein:
the method is performed by a portable thermal imaging system;
the changes in the scene comprise a gas plume; and
the method further comprises presenting the comparison image on a display of the portable thermal imaging system.

11. A system comprising:
a thermal imager;
a motion sensor; and
a logic device configured to:
operate the thermal imager to capture a plurality of thermal images of a scene,
detect motion associated with the thermal imager during the thermal image capture using the motion sensor,
determine a temporal delay based on the detected motion, wherein the temporal delay is correlated with the detected motion,
select a first thermal image from the thermal images, and select a second thermal image from the thermal images, wherein the first and second thermal images are captured at corresponding first and second times separated by the temporal delay, and
process the first and second thermal images to generate a comparison thermal image identifying changes in the scene between the first and second times;
wherein the motion is a first detected motion, the temporal delay is a first temporal delay, the comparison thermal image is a first comparison thermal image, and the logic device is further configured to:
detect a second motion associated with the thermal imager during the capturing;
determine a second temporal delay based on the second detected motion, wherein the second temporal delay is greater than or less than the first temporal delay, wherein the second temporal delay is correlated with the second detected motion;
select a third thermal image from the thermal images, and select a fourth thermal image from the thermal images, wherein the third and fourth thermal images are captured at corresponding third and fourth times separated by the second temporal delay; and process the third and fourth thermal images to generate a second comparison thermal image identifying changes in the scene between the third and fourth times.

12. The system of claim 11, wherein the changes in the scene comprise changes in a gas plume.

13. The system of claim 11, wherein the temporal delay corresponds to a number of the captured thermal images and/or a time period, wherein the temporal delay is determined using a predetermined correlation between the detected motion and the temporal delay.

14. The system of claim 11, wherein the temporal delay is inversely proportional to the detected motion.

15. The system of claim 11, wherein the comparison thermal image is a difference image.

16. The system of claim 11, wherein the logic device is further configured to subtract the second thermal image from the first thermal image to perform the process.

17. The system of claim 11, wherein the first detected motion is greater than the second detected motion, and the first temporal delay is smaller than the second temporal delay.

18. The system of claim 17, wherein the plurality of thermal images are captured at a fixed frame rate.

19. The system of claim 11, wherein the first thermal image is a most recently captured one of the thermal images and the second thermal image is an earlier captured one of the thermal images.

20. The system of claim 11, wherein:
the system is a portable thermal imaging system;
the changes in the scene comprise a gas plume; and
the portable thermal imaging system further comprises a display configured to present the comparison image.

* * * * *